UNITED STATES PATENT OFFICE.

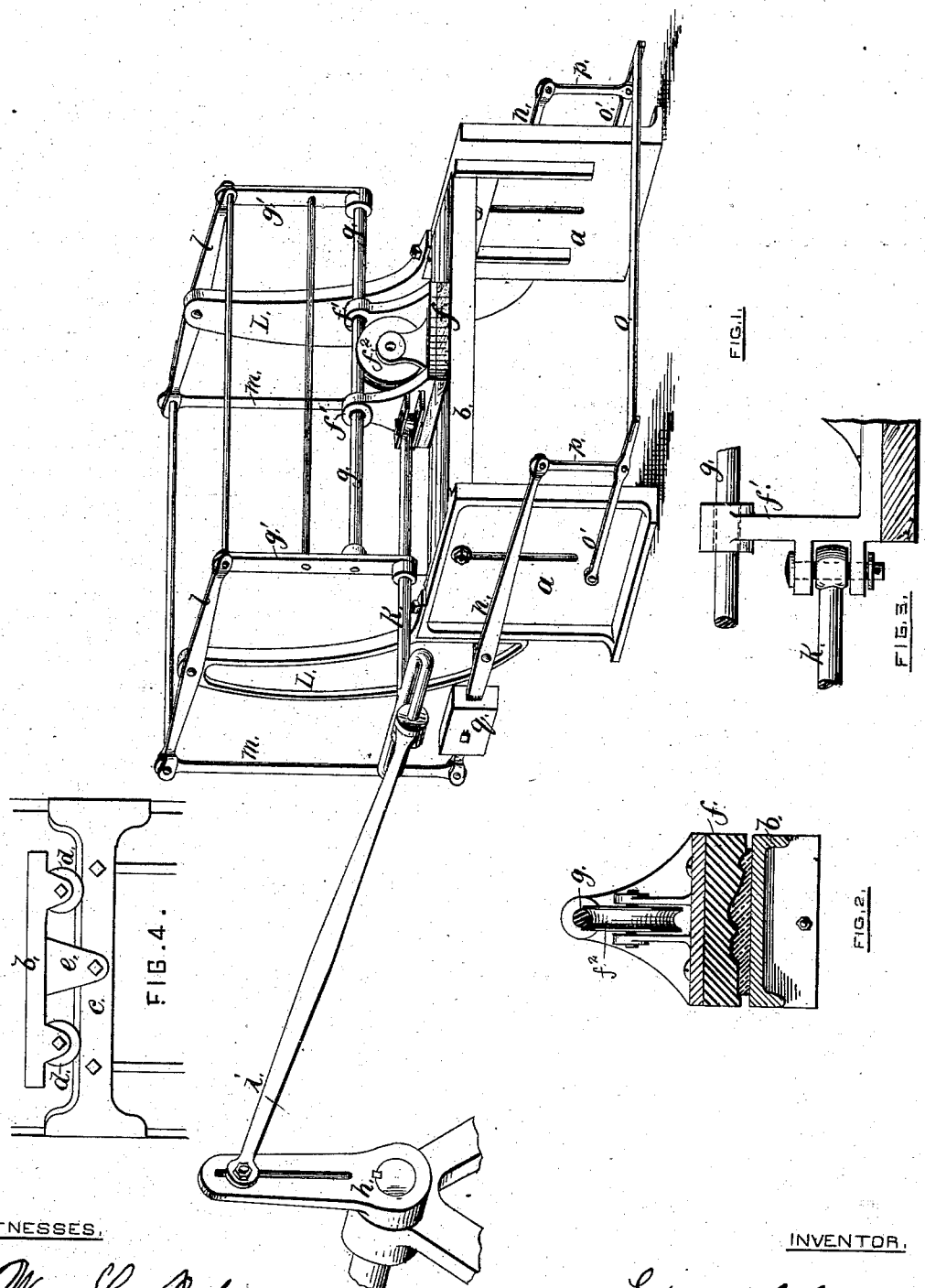

EDWARD S. SMITH, OF PROVIDENCE, RHODE ISLAND.

SANDPAPERING-MACHINE.

SPECIFICATION forming part of Letters Patent No. 239,864, dated April 5, 1881.

Application filed August 5, 1880. (No model.)

*To all whom it may concern:*

Be it known that I, EDWARD S. SMITH, of the city and county of Providence, and State of Rhode Island, have invented a new and useful Improvement in Sandpapering-Machines; and I hereby declare that the following is a full, clear, and exact description of the same, reference being had to the accompanying drawings, forming part of this specification.

The object of this invention is to produce a machine by which the surface of any kind of wood-work or other surface can be sandpapered, rubbed, or polished by power.

The invention consists in the construction, combination, and arrangement, in a sandpapering-machine, of an adjustable platen to receive the work, an adjustable rubber to which reciprocating motion is imparted, and a frame provided with a foot-treadle by which the pressure of the rubber is controlled and the rubber lifted from the work, as will be hereinafter more fully set forth and claimed.

Figure 1 is a perspective view of the machine, showing the adjustable platen or table, the rubber connected with a crank by means of which it is reciprocated, and the frame on which the rubber is supported, and by which it is raised and lowered. Fig. 2 is a sectional view of the rubber provided with a pad for rubbing a molding with sand-paper, pumice-stone, or other grinding, rubbing, or polishing material. Fig. 3 is an enlarged view of one end of the rubber, showing the manner of securing the connecting-rod to the same. Fig. 4 is a sectional view, showing the table supported by wheels on adjustable slides, so that lateral motion may be imparted to the same.

In the drawings, $a\ a$ are the end supports of the table, and $b$ is the table on which the work is secured. This table is shown vertically adjustable, so that the same may be lowered to receive articles of varying thickness. The table may also be mounted on rolls or wheels which run on ways, as shown in Fig. 4, so that a lateral motion may be imparted either by the operative or by power; or the table may rest on slides, on which it can be moved laterally.

In Fig. 4 C is the adjustable slide. $d\ d$ are the wheels; and $e$ is an arm extending from the table to the slide $c$, by which the table can be secured to the slide by means of a bolt, so that the table may be allowed to reciprocate laterally, or may be firmly secured.

$f$ is the rubber, the surface of which may be flat for flat work, or have any desired shape best suited for the work to be performed, and may be covered with sand-paper, emery-paper, felt, or any other material that will scour, rub, or polish. The rubber is suspended from the rod $g$ by the brackets $f'\ f'$, so that its lower surface can freely adjust itself on the surface to be rubbed, and for this purpose the brackets $f'\ f'$ may fit loosely on the rod $g$, as indicated by dotted lines, Fig. 3. To prevent binding and friction of the brackets on the rod $g$ the concaved wheel $f^2$ is mounted on the rubber, bearing against the rod $g$ when the rubber is pressed against the work. In reciprocating the rubber is guided by the rod $g$ in a true line, but is free to adjust itself on the surface. Reciprocation is imparted by means of the crank $h$, which is driven by some motor. The crank $h$ is provided with a slot, in which the connecting-rod $i$ can be secured at any desired distance from the center, so that any desired length of stroke can be secured. The connecting-rod $i$ and the rubber are secured together by means of the rod $k$, which is loosely jointed with the connecting-rod and the rubber in any suitable manner, so that while positive reciprocating motion is imparted to the rubber the rubber is free to adjust itself to the surface to be rubbed, and can be readily raised with the rod $g$ off from the work.

In the drawings the connecting-rod is secured to a loop on the rod K; but this connecting-rod may be secured to a cross-head working in fixed slides, and the rubber connected, by means of a swiveled bar, $k$, with the cross-head, so that reciprocation may be imparted to the rubber. The rubber may freely adjust itself to the work, and may be lifted from the work.

The rod $g$, from which the rubber is suspended, and by which it is guided, is secured to the arms $g'\ g'$, which are hinged in the centrally-pivoted levers $l\ l$, supported on the extensions L, secured to the ends $a\ a$. The rod $g$ and the rubber are therefore free to swing laterally, and thus add still more to the absolute freedom of the rubber to adjust itself.

The levers $l\ l$ are hinged to the rods $m\ m$, and these to the levers $n$, which are pivoted to the ends $a\ a$. The foot-treadle $o$, secured to the hinged arms $o'\ o'$, is connected with the levers $n\ n$ by means of the connecting-rods $p$.

To counterbalance the weight of the rubber and the parts forming the frame-work supporting the same, the weights $q$ are placed on the levers $n$, secured by a clamp-screw, so that they may be arranged so as to more than counterbalance the weight and keep the rubber suspended above the work until the same is pressed down by the foot-treadle $o$.

The levers $n$ may be arranged so as to be latched or secured by a ratchet in any position, by which the desired pressure is secured on the rubber, and when so arranged the foot-treadle may be released and the work go on; but if this is to be successfully done the levers $n$ must be made so as to give sufficient spring to allow the rubber to yield to any inequalities, or springs may be inserted at any of the connections, which springs may be made adjustable, so that the rubber will bear on the the work with a yielding spring-pressure.

The arms $g'\ g'$ may be made tubular, and spring-pressed extensions may support the rod $g$, so as to give a limited yielding play to the rod. All such details will readily suggest themselves to any skilled workman. The main and most important point in this invention is to have the rubber freely adjustable to its work, so as to prevent injury to the surface.

Having thus described my invention, I claim as new and desire to secure by Letters Patent—

1. In a sandpapering-machine, the reciprocating rubber $f$, its brackets $f'\ f'$, the rod $g$, from which said rubber brackets are suspended loosely, a counterbalanced frame in which said rod is fixed, and a crank and connections with said rubber, combined and arranged to operate substantially as described.

2. In a sandpapering-machine, the combination, with the rod $g$ for supporting the rubber, the counterbalanced frame $g'\ l\ L$, in which said rod is arranged, and a treadle, $o$, connected with said frame to raise and lower the rubber, substantially as and for the purpose described.

3. In a sandpapering-machine, a reciprocating rubber, its supporting-rod $g$, the arms $g'\ g'$, in which said rod is secured, the levers $l\ l$, pivoted to a portion of the framing of the machine, the rods $m$, extended downwardly from said levers, and the counterbalanced levers $n$, connected with the treadle $o$, combined and arranged for effecting the raising and lowering, the guiding and the pressing upon the surface to be rubbed, of said rubber, substantially as described.

4. The rubber $f$, suspended from a treadle-operated counterbalanced vibratory frame, as shown, in combination with the rod K, loosely connected with said rubber, the rod $i$, connected with rod K, and the crank $h$, having adjustably connected therewith the rod $i$, and serving to impart a horizontal reciprocating motion to said rubber, substantially as described.

5. The combination, with the rod $g$ and the reciprocating rubber, of the anti-friction wheel $f^2$, as described.

E. S. SMITH.

Witnesses:
JOSEPH A. MILLER,
J. A. MILLER, Jr.